UNITED STATES PATENT OFFICE.

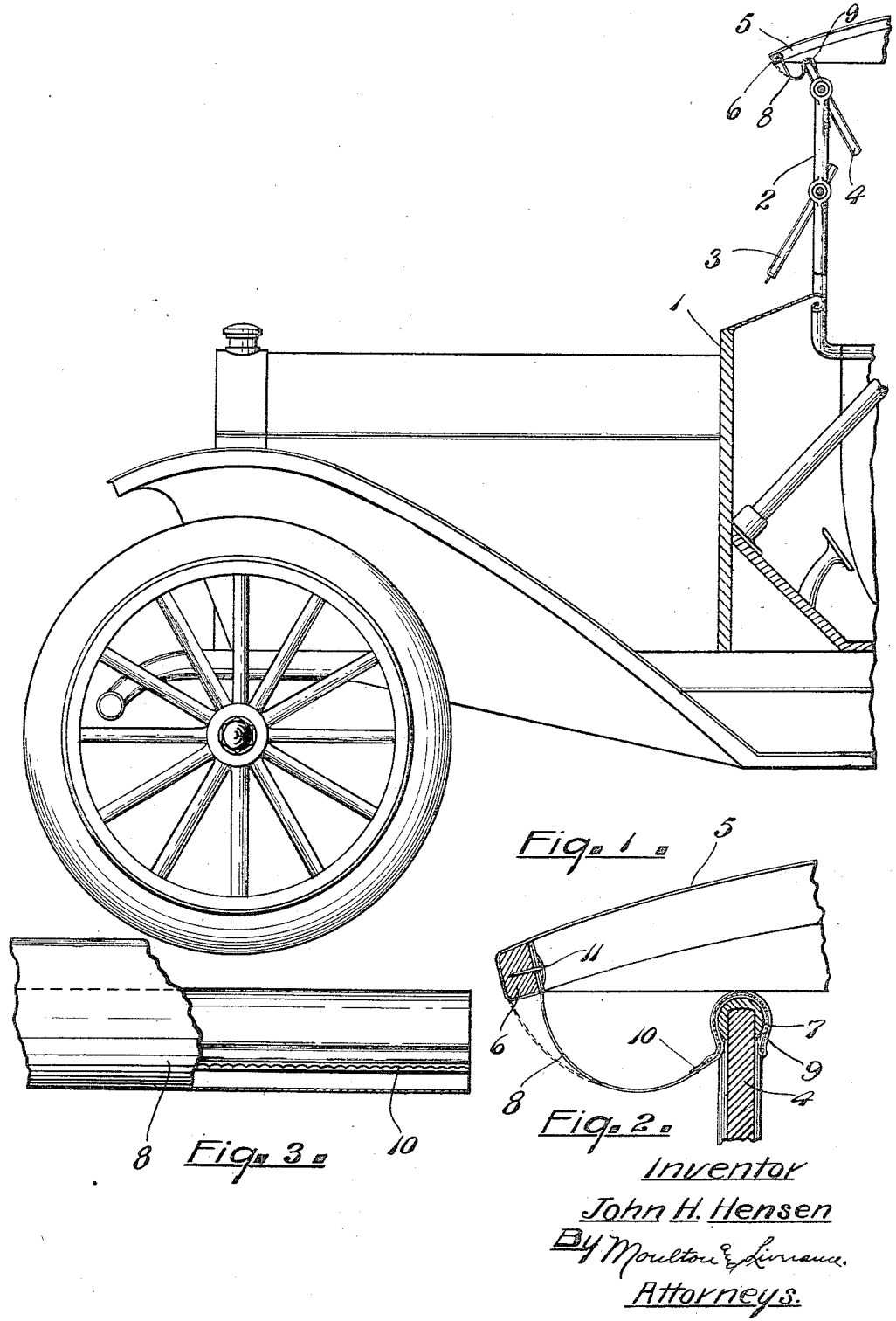

JOHN H. HENSEN, OF GRAND RAPIDS, MICHIGAN.

TOP AND WIND-SHIELD CONNECTOR.

1,266,123.  Specification of Letters Patent.  Patented May 14, 1918.

Application filed January 2, 1917. Serial No. 140,284.

*To all whom it may concern:*

Be it known that I, JOHN H. HENSEN, a citizen of the United States of America, residing at Grand Rapids, in the county of Kent and State of Michigan, have invented certain new and useful Improvements in Top and Wind-Shield Connectors; and I do hereby declare the following to be a full, clear, and exact description of the invention, such as will enable others skilled in the art to which it appertains to make and use the same.

This invention relates to a wind shield and top connector for use especially with motor vehicles. It is an object and purpose of my invention to provide a connector which may be interposed between the upper part or section of a wind shield and the front end of a motor vehicle top thereby closing the space between them and stopping the passage of air, snow, rain, sleet or the like between them. My invention, for attaining this end, is of very simple construction and is so constructed that it may be attached to the top and wind shield, yet permit the various adjustments of the wind shield for ventilation and the like as heretofore.

For an understanding of the construction in which my invention is embodied reference may be had to the accompanying drawing in which, Figure 1 is a side elevation, with parts shown in section, of a motor vehicle having my invention aplied thereto.

Fig. 2 is a vertical section taken through the upper part of a wind shield and the forward part of the top and illustrating the invention as connected to and interposed between them.

Fig. 3 is a partial front and sectional view of the connector.

Like reference characters refer to like parts throughout the several views of the drawing.

A motor vehicle such as indicated at 1 ordinarily carries in front of the driving seat, a frame 2 in which the wind shield sections 3 and 4 are pivotally mounted as indicated in Fig. 1. The upper section 4 is pivoted to swing about a horizontal axis, its upper edge being spaced a short distance from the top 5 of the vehicle. In the construction of the top a front bow 6 is made use of to which the top fabric is secured at its front edges. The wind shield is of glass which is set in a frame the upper member 7 of which only is fully illustrated, it being one member to which the connector is attached.

The construction heretofore described is of usual and well known type common to practically all motor vehicles. The connector between the top and wind shield includes an elongated section of fabric 8 preferably of the same material of which the top is made and of a length equal to the length of the wind shield. At one edge the fabric passes underneath an elongated sheet metal clip 9 substantially U-shaped in cross section and made of spring material so that when it passes over the upper member 7 of the frame of the upper section 4 of the wind shield, it will clasp the same and hold the connector firmly in place. The fabric after passing underneath this clip is turned around the same and over the outside completely covering it. It is then secured at its edge to the under layer of the fabric as indicated in Figs. 2 and 3. I have shown a seam 10 as the connecting means used though any other suitable permanet connection may be used as well.

The connector is interposed between the upper frame member of the upper section of the wind shield, clip 9 being passed over this frame member as shown in Fig. 2, while the opposite edge of the connector is led to the bow 6 and secured thereto in any suitable manner. I have shown tacks 11 as passing through the connector and into the bow for permanently securing the connector to the bow. It is of course understood that any other means of connection may be used either permanent or detachable.

With a device of this kind applied to and interposed between the wind shield and top of a motor vehicle, the wind shield has its complete range of adjustment on account of the flexibility of the material from which the connector is made and, at the same time, whenever the top is to be put down, the connector may be readily detached from the wind shield and carried by the top in its collapsed condition. This device closes the space between the upper part of the wind shield and the top blocking the draft which ordinarily passes over the upper edge of the wind shield and under the top and stopping the passage of rain, snow or the like and making possible the complete closure of the top when the side curtains have been attached. This device is of special utility in cold and stormy weather, but it is also useful at all times to stop any draft passing over the upper edge of the wind shield and down onto the occupants of the vehicle.

I claim:—

1. A connector adapted for connection to a motor vehicle top and wind shield comprised of a section of fabric and a spring clip substantially U-shaped in cross-section, said fabric at one edge being secured to the clip, and said clip extending substantially the full length of the wind shield, substantially as described.

2. A connector adapted for connection to a motor vehicle top and detachably connected to a wind shield comprised of a section of fabric of substantially the same length as the wind shield, and a spring metal clip substantially U-shaped in cross section and of the same length, said fabric at one edge entirely covering the clip, substantially as described.

3. A connector of the character described comprising a spring metal clip, U-shaped in cross section and of a length substantially equal to the length of a wind shield, and a relatively narrow strip of fabric of substantially the same length as the clip, said fabric being free at one edge and adjacent its other edge passing under and conforming to the clip and then around and over the same, the edge of the fabric passing beyond the clip and lying against the body of the fabric and secured thereto, substantially as described.

In testimony whereof I affix my signature.

JOHN H. HENSEN.

Copies of this patent may be obtained for five cents each, by addressing the "Commissioner of Patents, Washington, D. C."